United States Patent
Fu

(10) Patent No.: US 10,189,319 B2
(45) Date of Patent: Jan. 29, 2019

(54) TIRE PRESSURE MONITORING SYSTEMS AND METHODS

(71) Applicant: Liming Fu, Rockville, MD (US)

(72) Inventor: Liming Fu, Rockville, MD (US)

(73) Assignee: Jianzhong Fu, Rockville, MD (US)

( * ) Notice: Subject to any disclaimer, the term of this patent is extended or adjusted under 35 U.S.C. 154(b) by 173 days.

(21) Appl. No.: 14/536,187

(22) Filed: Nov. 7, 2014

(65) Prior Publication Data

US 2015/0061852 A1    Mar. 5, 2015

Related U.S. Application Data

(63) Continuation of application No. PCT/CN2013/087531, filed on Nov. 20, 2013.

(30) Foreign Application Priority Data

Nov. 20, 2012 (CN) .......................... 2012 1 0492762

(51) Int. Cl.
  *B60C 23/02* (2006.01)
  *B60C 23/04* (2006.01)
  *B60C 23/06* (2006.01)

(52) U.S. Cl.
  CPC .......... *B60C 23/02* (2013.01); *B60C 23/0474* (2013.01); *B60C 23/0488* (2013.01); *B60C 23/061* (2013.01)

(58) Field of Classification Search
  None
  See application file for complete search history.

(56) References Cited

U.S. PATENT DOCUMENTS

| | | | | |
|---|---|---|---|---|
| 2003/0058118 A1* | 3/2003 | Wilson | ................ | B60C 23/0423 340/679 |
| 2003/0121319 A1* | 7/2003 | Kojima | ................ | B60C 23/061 73/146.2 |
| 2007/0038408 A1* | 2/2007 | Gaunt | ................... | B60C 23/001 702/138 |
| 2007/0279203 A1* | 12/2007 | Thomas | ............... | B60C 23/068 340/447 |
| 2010/0063669 A1* | 3/2010 | Fink | .................... | B60C 23/0416 701/29.6 |

(Continued)

*Primary Examiner* — Thomas S McCormack
(74) *Attorney, Agent, or Firm* — Syncoda LLC; Feng Ma; Junjie Feng

(57) ABSTRACT

An improved method for a passenger car tire pressure monitoring system (TPMS), including improvements of a direct TPMS or an indirect TPMS technique. The direct TPMS uses a dynamic tire pressure reference as a tire pressure determination basis, and monitors the real-time tire load, e.g., when the wheel load changes, the TPMS data processing center takes the tire cold inflation pressure data corresponding to the real-time load as the current tire pressure reference, and performs determinations and warnings for the real-time tire pressure data. The indirect TPMS establishes a wheel speed reference database based on a vehicle speed reference, and conducts compensations and corrections for wheel speed distortions caused by the tire wear in use, and performs an analysis and comparison between the compensated and modified real-time wheel speed and the data from the wheel speed reference database, and makes a real-time tire pressure information indication or warning.

4 Claims, 4 Drawing Sheets

(56) References Cited

U.S. PATENT DOCUMENTS

2011/0140875 A1\* 6/2011 Be .................. B60C 23/009
   340/442
2015/0005982 A1\* 1/2015 Muthukumar ............ B60T 1/10
   701/1

\* cited by examiner

TIRE PRESSURE MONITORING SYSTEMS AND METHODS

CROSS-REFERENCE TO RELATED APPLICATIONS

The present application is a continuation of, and claims priority to, PCT/CN2013/087531 filed on Nov. 20, 2013, which claims priority to Chinese Patent Application No. CN 201210492762.9 filed on Nov. 20, 2012. The disclosures of these applications are hereby incorporated by reference in their entirety.

BACKGROUND

A Tire Pressure Monitoring System, or TPMS, can perform real-time monitoring of a tire pressure, and provide warning for a low tire pressure or an overly high tire pressure. TPMS include direct TPMS and indirect TPMS. In indirect TPMS, tire speed changes are monitored through monitoring tire deformations (wheel rotating diameter). Then tire deformations are described by tire pressure variations. In direct TPMS, pressure sensors monitor tire pressures directly. Tire deformations are kept under their limits through tire pressures controls. The ultimate goal for direct TPMS and indirect TPMS is to monitor tire deformations and keep them under limits. Tire pressure is an intermediate variable that describes tire deformation. Based on the current TPMS standards (FMVSS 133, GB/T 26149 and et. al.), TPMS should provide the real-time tire pressure and warning by means of sound or light when real-time tire pressure is below 75% of cold tire pressure or above 125% of it.

The purpose of designing TPMS is to inform people to adjust tire pressures by providing tire pressure abnormal warning, so that crashes related to tire failure could be avoid. According to the technical report on TPMS effectiveness evaluation by NHTSA in November 2012, the presence of TPMS on a vehicle is estimated to result in a 55.6 percent reduction in the likelihood that the vehicle will have one or more severely underinflated tires (25% or more below the vehicle manufacturer's recommended cold tire pressure). However, it is difficult to evaluate the reduction of tire failure and crashes. That is to say, TPMS is not effective at preventing tire failures and crashes.

SUMMARY

Tire property shows that tire pressures are proportional to tire loads which are proportional to tire deformations when tire loads do not exceed placard loads. The most direct and convenient method to keep tire deformations within limits is to monitor and adjust tire pressures. Because of "load reserve" properties of tires, tire loads could not exceed maxi load nor below vehicle mass. For passenger cars, tire deformations would stay within limits if tires have been inflated properly based on the load. So it is necessary to indicate tire pressures under both half-loaded condition (<3 occupants) and loaded condition (4-7 occupants). Take Audi Q7 for an example, the front tire pressure is 240 KPa under half-loaded condition and 300 Kpa under loaded condition. The rear tire pressure is 240 KPa under half-loaded condition and 340 Kpa under loaded condition.

The current TPMS analyses real-time tire pressures and makes determinations based on cold tire pressure under half-loaded condition. This does not meet the tire technical standard (GB/T 2978) in which tire pressures should vary with load. TPMS has obvious and definite technical flaw as it fails when load changes. With the popularization of TPMS, more and more passenger car manufacturers indicate only one tire pressure instead of cold tire pressures under half-loaded and loaded conditions. Technical bias exists in this area.

Research on vehicles equipped with TPMS shows that TPMS could not provide warnings for abnormal tire pressures when tire deformations cause by load variations are far beyond limits. The current TPMS, which includes direct TPMS and indirect TPMS, could not detect underinflation or severe underinflation caused by changes of load. All TPMS products and vehicles equipped with TPMS are defective since they could not meet the TPMS standard.

Chinese Patent Application No. 201010592003.0 discloses a method for distinguishing freight vehicle tire pressure abnormality. In this application, a database is proposed to help remediating the flaws of the current TPMS. This database could include parameters like tire models, relations between load and tire initial pressures, real-time tire pressures, load, speed, temperatures and so on. The tire pressure at 18 degree Celsius could be calculated from real-time tire pressure according to a function of tire pressure, load, temperature and speed. Then the tire pressure at 18 degree Celsius is compared with the tire initial pressures in the database before TPMS provide a accurate warning.

The technical solutions disclosed by Chinese Patent Application No. 201010592003.0 are indicated for use by freight vehicles. A lot of parameters are used in this patent. It could increase the accuracy of warnings for abnormal pressures at the expense of restricted working conditions for tires. The drivers could feel overwhelming by frequent warnings and accurate date. As such, these approaches may not be practical in transportations.

Tire properties are technical knowledge. Inflating tires properly according to load is technical knowledge that has been regulated by national standard. Technically, monitoring load and determination of dynamic tire pressure benchmark are not difficult. The passenger car manufacturers overestimate functions of tire load reserve; ignore researches on hazard caused by over deformation of tires due to load variations; or take it for granted that drivers would resist inflating tires properly according to load. They have technical bias and take only one tire pressure as benchmark. This bias misleads users from taking dynamic tire pressures based on load as benchmarks. One of the evidences for the bias is that only one tire pressure is in the passenger car tire pressure label, while in the past tire pressures under both half-loaded and loaded conditions were there.

Indirect TPMS (wheel-speed based TPMS) can infer tire pressure from monitoring wheel speed (tire deformation) because they are related. Indirect TPMS can collect wheel speed in real time in a few hundreds of seconds after car is moving. After some corrections, this wheel speed becomes standard for (current) wheel speed, which is random and based on the assumption that the (current) tire pressure is normal. This (current) wheel speed standard is not related to cold tire pressure, and is abnormal when (current) the tire pressure is abnormal. Indirect TPMS will provide wrong tire pressure if wheel speed standard is abnormal due to severe tire underinflation and tire over deformation caused by load increase. That is to say, the current indirect TPMS could not detect severe tire underinflation and tire over deformation caused by load increase. One solution is to have car speed standard and wheel speed standard that do not change with tire deformation.

In an aspect, a vehicle tire safety monitoring system is provided. The system can include a processor, wherein the processor is configured to determine a real-time tire safety baseline based on a real-time condition of the vehicle.

In some embodiments, the real-time tire safety baseline comprises a tire pressure baseline, and wherein the processor is configured to determine a dynamic correlation between the tire pressure baseline and a tire load by at least one of a database lookup or a mathematical relationship.

Embodiments disclosed herein may cure some deficiencies in the current TPMS. In particular, tire pressure monitoring is provided.

Constructing a database of tire pressure standards and/or mathematical relations between loads and tire pressures: tire pressure standards are cold tire pressures (that correspond to load) when vehicle is properly loaded. All tire pressure standards are included in the database. The tire pressure is a function of load depending on vehicle model and tire type.

Current tire pressure standards are cold tire pressures that correspond to current loads. TPMS ECU can call corresponding tire pressure standard from the database after current load is known. So that the dynamic correlations between tire pressure standards and loads are realized. The tire pressure standard can be adjusted based on the mathematical relations between loads and tire pressures.

Real-time load data are collected by load sensors mounted on bearing parts of each wheel, and/or collected directly or indirectly by other types of sensors mounted on other parts of the vehicle. Data collecting methods include continuous collecting and/or pulse collecting of static and/or dynamic load data.

Load sensors include and are not limited to pressure sensors, displacement sensors, chair sensors, infrared sensors, and ultrasound sensors.

The real-time tire load data are transmitted to TPMS ECU via wire transmission and/or wireless transmission.

The TPMS can provide driver information such as tire pressure standard and real-time tire pressure simultaneously by sounding and/or screen display. For example, real-time tire pressure, current tire pressure standard and its boundaries (±25%) can be provided by at least one of an audio signal, a visual signal on a screen or with a light indicator, or a heptic indication.

Embodiments disclosed herein provide technologies that can improve the indirect TPMS for passenger cars, including:

1. The standard car speeds of TPMS can be measured by a vehicle navigation system (such as the GPS system, or the BeiDou Navigation Satellite System). A database of wheel speeds corresponding to standard car speeds and standard wheels could be created. The mathematical equation of car speeds and wheel speeds is: $Vg=\omega R=n2\pi R=nz\alpha R$, $Vg$ is car speed measured by GPS, $\omega$ is angular speed of wheel, $n$ is the wheel rotation number, $z$ is the number of teeth of wheel speed sensor, $\alpha$ is the angle (radians) between two teeth (corresponding to two electric signal), $R$ is rotating radius of the wheels.

2. The tire wear and real-time rotating radius of tire can be calculated from car mileage based on the relation between tire life-span and maxim tire wear. The ratio of real-time rotating radius of tire to standard rotating radius of tire can be used to correct the bias of real-time tire speed caused by wear.

3. Comparing the real-time tire speed data after correction and compensation with the standard tire speed database, or calculating based on the mathematical relationship models of car speed/tire shape variation/tire pressure, determining that the tire pressure is abnormal and providing warnings.

A standard tire is new without wear and under cold half-loaded inflation condition. The standard tire speeds database comprises GPS measured speeds and corresponding wheel speeds when car speeds are between zero and max limit and tire pressures are from 75% to 125% of cold tire pressures under half-loaded inflation conditions. The analytical mathematical models are mathematical relations between GPS measured speeds and corresponding wheel speeds when car speeds are between zero and max limit and tire pressures are from 75% to 125% of cold tire pressures under half-loaded inflation conditions The tire mileage can be the accumulative mileage data from the vehicle GPS and/or from the vehicle speedometer.

The embodiments disclosed herein can have one or more of the following advantageous effects:

First, the technical approaches are based on research on tire over-the-limit deformation and the resulting hidden underinflation caused by tire load changes. The reason and hazard of technical biases for passenger cars are revealed. The reasons that the presence of TPMS on a vehicle does not obviously reduce car accidents by tire failure are explained. A standard tire pressure database can be created by real-time tire load data. Standard tire pressure can be corrected by real-time tire load. This technical improvement for direct TPMS is characterized by using a dynamic tire pressure standard, that is, the tire pressure standard is cold tire pressure corresponding to current load. This technique, which can remediate the flaws of the current direct TPMS, was not studied and abandoned because of technical biases for passenger cars. This invention can also improve tire pressure monitoring and information display for current TPMS through providing drivers information like tire pressure standard, tire pressure standard boundaries and real-time tire pressure simultaneously by screen display and/or sounding allowing the driver to adjust tire pressures promptly.

Second, by using vehicle GPS recorded car speed as standard and using corresponding wheel speed standard database, or mathematical relations between car speeds and wheel speeds and mathematical relations between mileage and wear, this technique can correct and adjust tire wear caused car speed bias and wheel speed bias and provide standard wheel speed for indirect TPMS.

Tire deformation is an intrinsic property of tire as its range does not vary with load and tire pressure. Tire deformation range does not change any matter the tire is fully loaded or half loaded and tire pressure is high or low. Tire deformation effects rotating radius of tire which has influence on tire speed. It is an innovation of the indirect TPMS to achieve seamless tire deformation monitoring by monitoring tire speed when tire speed standard and compensation to wear caused tire speed changes are known.

As such, the "indirect" tire safety monitoring methods according to some embodiments disclosed herein do not necessarily need to monitor a tire pressure, tire load, or calculate a tire pressure baseline, even though the tire safety system may still be referred to as "TPMS." Rather, by monitoring a vehicle condition, such as the vehicle speed measured by a more accurate method, such as using the vehicle navigation system (such as GPS), and comparing the accurate vehicle speed with that measured by the vehicle through the wheel rotating while the road, the onboard processor can determine the tire deformation, such as a change in the wheel/tire radius, and thereby provide an indication to the driver, such as a warning that the tire is in an unsafe condition (such as in an underinflated or an overinflated state).

The indication device can be existing devices on the vehicle, such as a screen display providing a visual indication, a speaker providing an audio indication, or a heptic feedback device providing a heptic indication. In either the "indirect" or the "direct" method, the driver can obtain the tire safety information, and take actions (such as inflating the tire) to improve safety.

DETAILED DESCRIPTION

Figure 1:
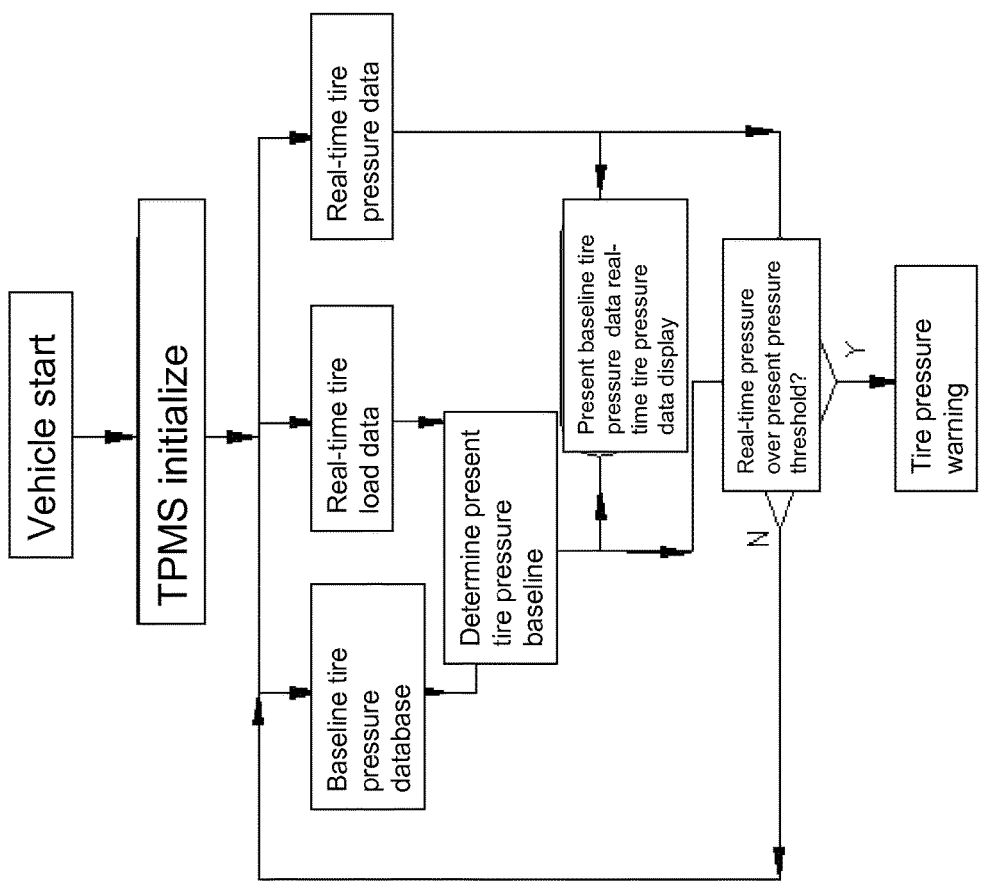
FIG. 1 is a software flowchart illustrating direct TPMS technology improved methods.

In an aspect, a vehicle tire pressure monitoring system is provided, a computer or a processor configured to realize dynamic correlation between tire pressure baseline and tire load by at least one of: establishing a database of tire pressure baseline, wherein the database comprises data of, within the allowable load regime of tires, tire cold inflation pressure data corresponding to tire load; and determining a present tire pressure baseline by selecting, from the database, tire pressure data corresponding to real-time tire load; or establishing a mathematical relationship between tire load and inflation pressure, wherein the mathematical relationship is established based on the vehicle design parameters and tire specification data; and providing compensation and correction to tire pressure baseline data under real-time tire load based on the mathematical relationship.

In some implementations, the system further includes a plurality sensors configured to collect data of the tire load. In some implementations, the plurality of sensors comprise at least one of: a pressure sensor, a displacement sensor, a seat sensor, an infrared sensor, or an ultrasound sensor. In some implementations, the plurality of sensors are configured to measure, directly or indirectly, real-time tire load data, and the plurality of sensors are configured to measure at least one of static tire load data or dynamic tire load data. In some implementations, the plurality of sensors are disposed at vehicle seats to measure occupancy of the vehicle to thereby indirectly measure the tire load data.

In some implementations, the plurality of sensors are disposed adjacent to or at the tires to measure directly the tire load data. In some implementations, the plurality of sensors are configured to transmit the measured data wirelessly to the processor.

In some implementations, wherein the mathematical relationship comprises: $Vg=\omega R=n2\pi R=nz\alpha R$, wherein Vg is a GPS speed, $\omega$ is a tire angular velocity, n is a number of tire revolutions, z is a number of wheel speed sensor teeth, $\alpha$ is an angle between two teeth of the wheel speed sensor, R is a radius of the tire, wherein the processor is configured to correct the wheel speed in real time resulting from tire wearing; wherein the correction is made based on a ratio between a real-time rotating radius and a standard tire rotating radius, and wherein the real-time rotating radius is calculated based on the tire wearing calculated from a tire mileage data based on a correlation between a tire lifetime and wearing limit.

In some implementations, the standard tire is a new tire or a wearing-free tire under a half load cold inflated state, the database or the mathematical relationship is based on the standard tire, between zero and a vehicle speed limit of vehicle speeds, in a range between a 75% half-load cold inflated pressure and a 125% half-load cold inflated pressure.

In some implementations, the tire mileage data are based on vehicle GPS mileage and/or vehicle odometer mileage.

In another aspect, a computer-implemented vehicle tire pressure monitoring method is provided, which can be implemented using non-transient computer-readable medium having instructions stored thereon. The method or instructions including: realizing dynamic correlation between tire pressure baseline and tire load by at least one of: establishing a database of tire pressure baseline, wherein the database comprises data of, within the allowable load regime of tires, tire cold inflation pressure data corresponding to tire load; and determining a present tire pressure baseline by selecting, from the database, tire pressure data corresponding to real-time tire load; or establishing a mathematical relationship between tire load and inflation pressure, wherein the mathematical relationship is established based on the vehicle design parameters and tire specification data; and providing compensation and correction to tire pressure baseline data under real-time tire load based on the mathematical relationship.

The first embodiment is where direct TPMS technology applied to passenger vehicles. In the specific vehicle design stage, manufacturers can get load for tires on each axis under half loaded and fully loaded working conditions or under half loaded, half full load and fully loaded working conditions from tire user manual, tire technical standard and calibrated measurements. Manufacturers can also get corresponding cold tire pressures. These data comprise TPMS dynamic tire pressure database.

Taking Audi A6 passenger car as an example, placard cold tire pressure for rear tire is 220 KPa under half load condition (3 occupants) and 290 KPa under full load condition (5 occupants). These pressures could be included in the TPMS tire pressure standard database directly as TPMS dynamic tire pressure. A linear mathematical relation between load and inflation pressure can be calculated based on the tire pressures under half load and full load conditions. The cold tire pressure under different load conditions (1, 2, 3, 4, 5 occupants) can be calculated according to this linear mathematical relation. The current tire pressure standard can be calculated from real-time load according to the analytical mathematical model of TPMS tire pressure with load as argument. Due to load stock property of tire, tire deformation could be under control when using cold tire pressures under half load and full load working conditions as standards.

Tire load (pressure) sensors are mounted on bearing parts of each wheel. These sensors can be connected to TPMS data processing center, or via data bus (e.g., CAN-BUS) communicate with TPMS data processing center, or can transmit data wirelessly to the processor.

It is possible to put forward a mathematical model that can correct and compensate cold tire pressure based on relation of tire load, deformation and tire pressure. The tire pressure standard would fit with tire load after compensation to the cold tire pressure according to real-time tire load.

Figure 2:
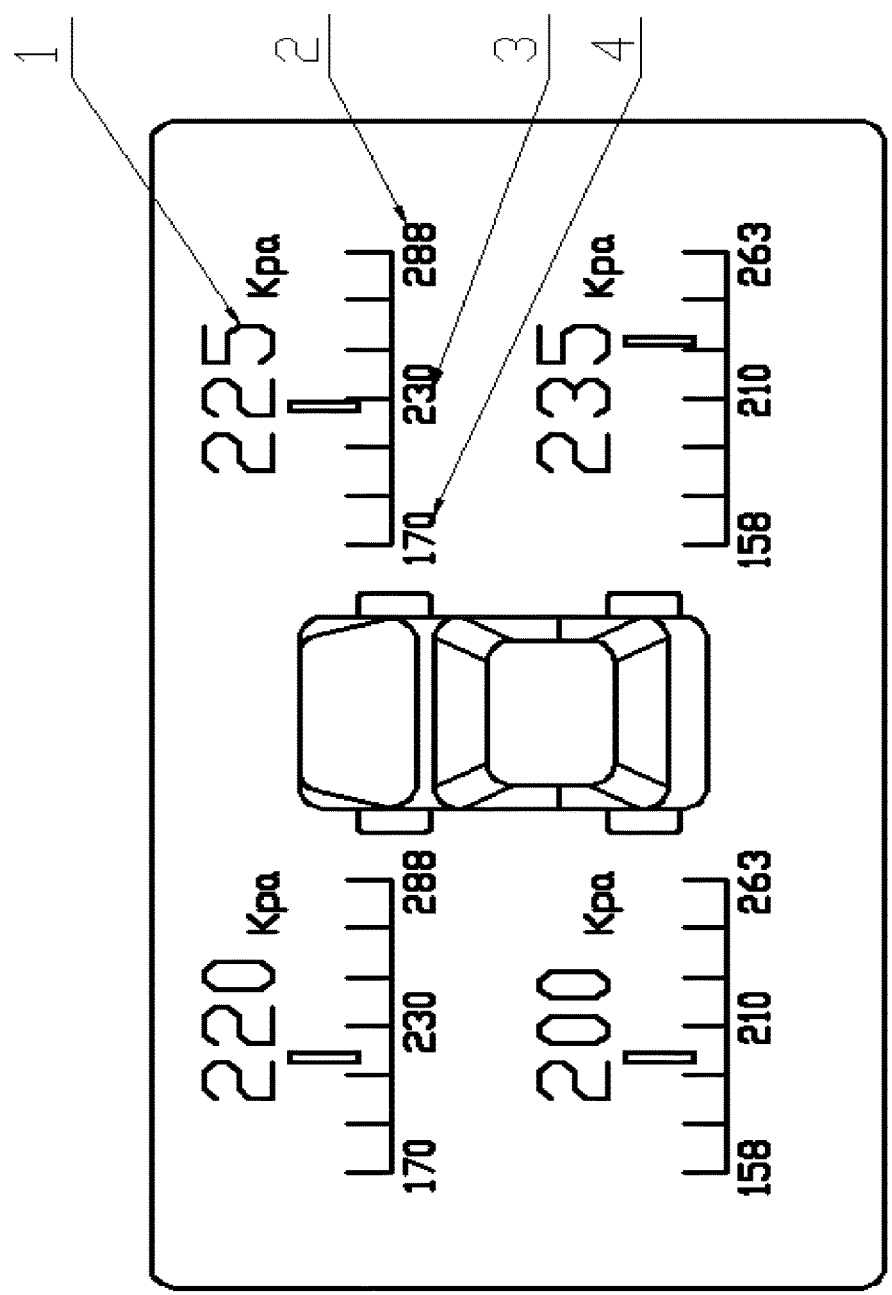
FIG. 2 is diagram illustrating simultaneous and same-screen display of tire pressure reference data and real-time tire pressure data.

By using a dynamic tire pressure standard, TPMS ECU can analyze real-time tire pressure based on current tire pressure standard and provide real-time tire pressure, current tire pressure standard, and maxima and minima value of current tire pressure standard simultaneously on screen or/and by sounding. FIG. 1 shows the flow chart of the procedure. The readout of tire pressure standard and its maxima and minima values provides driver tire pressure that is corresponding to load. In FIG. 2, 1 is real-time tire pressure, 3 is tire pressure standard, 2 is maxima value of tire pressure standard, 4 is minima value of tire pressure standard. By comparing real-time tire pressure and tire pressure standard, the driver could get deviation of tire pressure from its standard and adjust tire pressure properly and promptly.

In embodiment 2, tire load can be monitored indirectly by chair sensors or other sensors. Real-time tire load can be calculated from product of number of occupants and average weight of occupant. For example, Audi A6 has a gross vehicle weight of 1800 kg. If average weight of an occupant is 100 kg, then the total weight of the car will increase to 2310 kg considering 510 kg of weight increase from 5 occupants and luggage. Therefore, the real-time tire load can be roughly calculated from the number of occupants. This embodiment could satisfy real life requirement due to the "load stock" property of tire and low requirement on tire load precision.

Existing automotive car seat sensors are relatively mature technologies. For example, some vehicle models have all the seats equipped with seat sensors, and most vehicle models have at least front row seat sensors. By simply including rear seat sensors, a vehicle load indirect monitoring can be achieved. After the installation of TPMS technology product, because of working conditions do not have to change the conditions of automotive electrical bus, the Embodiment 2 of the present disclosure is particularly suitable for post installation of TPMS technology product. Except the indirect monitoring of the load data, Embodiment 2 is similar to Embodiment 1.

Embodiment 3 includes an indirect method of TPMS defect elimination and improvements. Existing indirect TPMS wheel speed data acquisition by ABS wheel speed sensors to monitor wheel speed, and data signals are transmitted through the vehicle wiring to the TPMS data processing Center (ECU).

Figure 4:
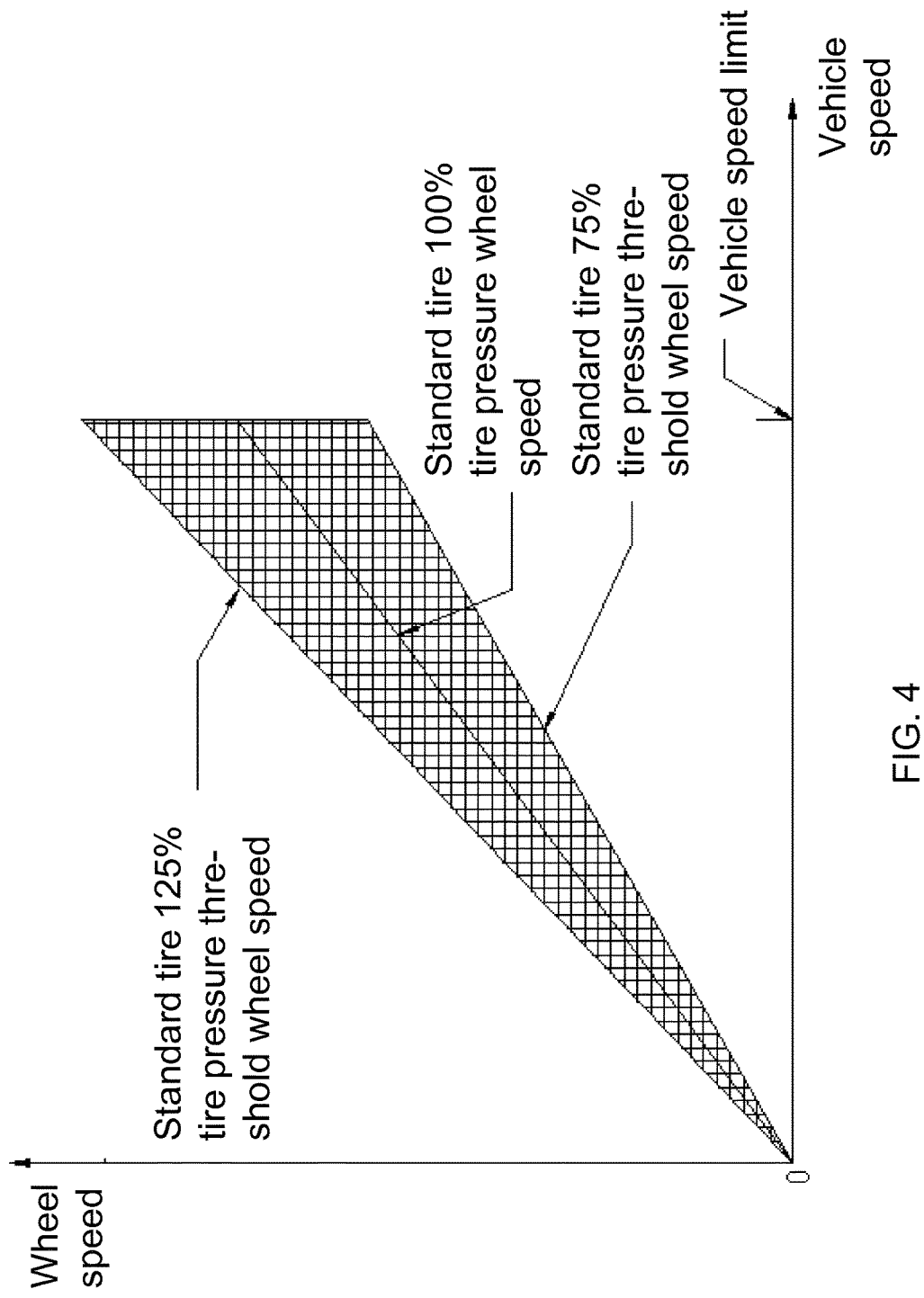
FIG. 4 is a mathematical diagram expression of wheel speed benchmark database.

Allowing for access to in-car GPS device in an existing indirect TPMS, the car GPS velocity data are fed into the indirect TPMS of the embodiment of the present disclosure, as TPMS speed benchmarks. In the GPS speed benchmarks, a new or wear-free tire is used, and the vehicle load is benchmarked cold tire inflation pressure under half load conditions, recorded in the GPS speed benchmarks under the speed range from zero to maximum vehicle speed/wheel speed data (wheel speed sensor electrical signal values) corresponding values, including wheels in the standard half load and 75% to 125% half load inflated pneumatic wheel speed data collection range (hatched area shown in FIG. 4), the establishment of GPS speed benchmarks a database under the reference wheel speed, vehicle speed, or establish the reference wheel speed at the vehicle speed based on the GPS vehicle speed, or wheel speed (the number of electrical signals) of the mathematical expression: $V_g = \omega R = n2\pi R = nz\alpha R$, wherein $V_g$ is GPS speed, $\omega$ is the angular velocity of the wheel, n for wheel revolutions, z stands for wheel speed sensor teeth, $\alpha$ stands for two teeth (corresponding to two electrical signals) between the angle (in radians), R is the radius of the wheels while rotating.

Based on correspondence between the limit by tire wear and tire life, it can be obtained the tire mileage and wear amount of the corresponding data. For example, the life of a certain type of tire is 50000 km, tire tread wear limit reduced height 5 mm, that is, the tire rotating radius is reduced by 5 mm, in terms of traveling 10,000 km per wheel rotating radius reduce 1 mm. Therefore, by the accumulated mileage car GPS data or data automobile mileage speedometer or sensor signals by the cumulative number of wheel speed, it can be calculated at any time of the wheel (tire) rotating radius. Wheel (with a worn tire) rotating radius and the standard wheel rotating radius of wheel speed ratio is real-time correction factor, distortion compensation by the wheel speed data lead to tire wear, close to the real wheel speed in reality.

If the vehicle during use due to accidental damage and replacement tires new tires, as the new tires have the rotating radius larger than the other wheels rotating radius, the wheel speed change and increased tire wear wheel speed reverse, TPMS data processing center is easy to identify the wheel speed variation, and can be realized through a "man-machine dialogue" (warning light+text display asking) mode, requiring the driver to make sure of the replacement tire (settings button). If confirmed as replacement tires already, TPMS data processing center to re-start the cumulative change tires and wheels mileage calculation tire wear; otherwise, it is determined to be caused by the tire pressure being abnormally high.

Figure 3:
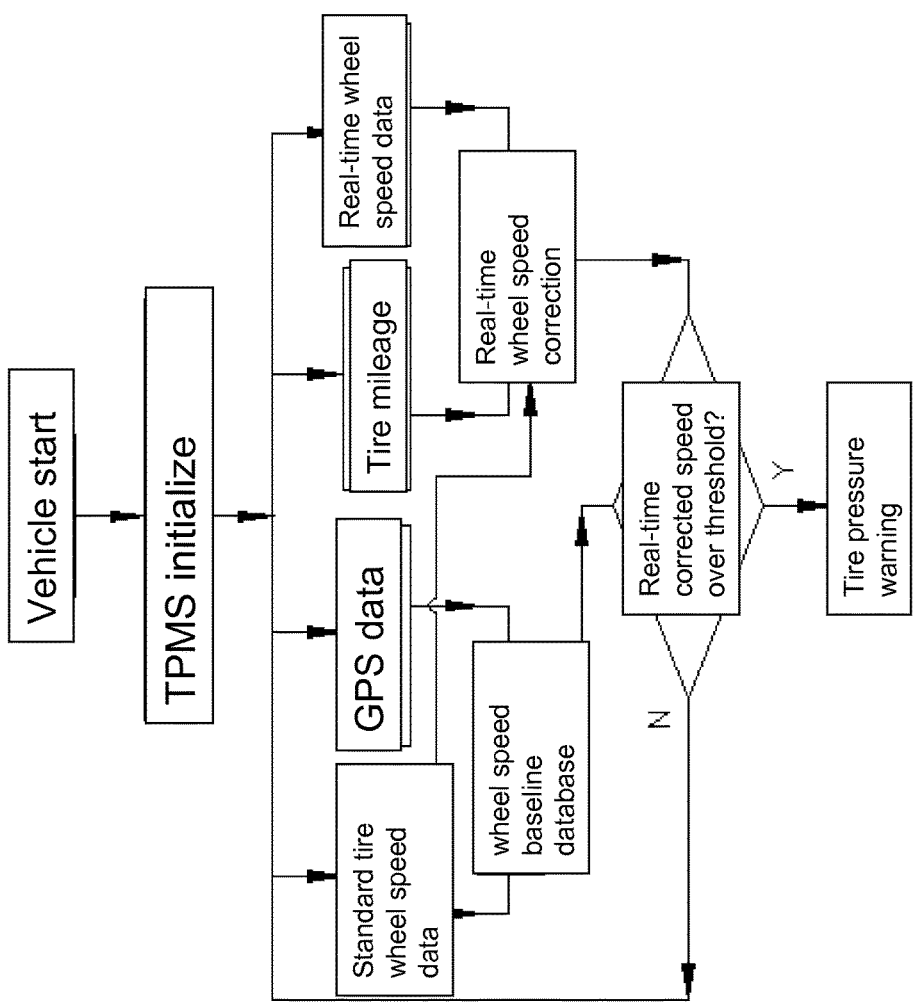
FIG. 3 is a software flowchart illustrating indirect TPMS technology improved methods.

After the GPS velocity data are cited for indirect TPMS wheel speed benchmarks or baseline, the two functions of establishing benchmarks and real-time correction wheel speed wheel tire wear caused by distortion can be achieved. Due to the establishment of a baseline database TPMS wheel speed, TPMS without going through the learning and memory to establish real-time wheel speed benchmarks, can be implemented to monitor the operation of the vehicle, significantly shortening the TPMS system response time; TPMS only monitor wheel speed and change, that is, when the real-time speed of the wheel speed values for the independent variables TPMS wheel speed data falling within the set range (size range shown in FIG. 4), you can determine the tire pressure to adapt to the load and deformation is not overrun, without concern tire load, tire pressure will be able to determine whether it is normal, eliminating the existing indirect TPMS technical defects, software flow chart shown in FIG. 3.

Wheel speed signal monitoring indirect TPMS methods can include a number of ways, such as wheel speed signal monitoring "wheel speed comparative method," "effective rotating radius method," "torsional stiffness method," "frequency method," and "tire model method," as well as the vehicle turns the wheel speed difference compensation process calculation methods. By introducing various embodiments of the present invention, the reference GPS speed, wheel speed reference database established and amended tire wear wheel speed distortion functions, the rest of the wheel speed monitoring methods and mathematical analysis of the relational model can invoke existing TPMS methods.

All references cited herein are incorporated by reference in their entirety. The various embodiments described herein can be implemented as a stand-alone TPMS system including a computer or a processor, or an add-on to existing systems by including a processor or computer, or a computer software, such as by implementing a non-transitory computer-readable medium having instructions stored thereon to realize the methods described herein.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A passenger car tire pressure monitoring system (TPMS) comprising:
    a processor, wherein the processor is configured to:
        determine a safety condition of a specific tire of the passenger car, based on deviations from a load-dependent tire pressure standard that is configured dynamically based on a real-time load of the specific tire measured by at least one load sensor; and
        determine the load-dependent tire pressure standard by looking up a database comprising a plurality of tire pressure standards correlating respectively with a plurality of loads for the specific tire;
    an indication device configured to provide at least one of a visual, audio, or heptic indication of the safety condition of the specific tire; and
    a plurality of sensors configured to collect data of the tire load;
    wherein:
        the safety condition comprises a tire deformation limit;
        the TPMS is a non-FMVSS138 system; and
        the plurality of sensors are disposed at seats of the passenger car to measure occupancy of the passenger car to thereby indirectly measure the tire load data.

2. The system of claim 1, wherein the plurality of sensors are configured to transmit the collected data wirelessly to the processor, or through a data bus to the processor.

3. A computer-implemented passenger car tire safety monitoring method, comprising:
    determining a real-time tire load based on a real-time monitoring by at least one load sensor of a specific tire of the passenger car;
    determining a dynamic correlation between a real-time tire pressure standard and the determined real-time tire load by looking up a database comprising a plurality of tire pressure standards correlating respectively with a plurality of loads of the specific tire;
    providing at least one of a visual, audio, or heptic indication of a tire safety status of the specific tire based on the dynamic correlation; and
    collecting, with a plurality of sensors data of the tire load;
    wherein:
        the safety status comprises a tire deformation limit;
        the TPMS is a non-FMVSS138 system; and
        the plurality of sensors are disposed at seats of the passenger car to measure occupancy of the passenger car to thereby indirectly measure the tire load data.

4. The method of claim 3, further comprising:
    determining the dynamic correlation between the real-time tire pressure standard and the real-time tire load further based on a mathematical relationship.

* * * * *